July 12, 1966
R. N. WAGNER ETAL
3,260,381
APPARATUS AND METHOD FOR TRANSFERRING
OBJECTS INTO A CONDITIONED ATMOSPHERE
Filed April 29, 1964
2 Sheets-Sheet 1
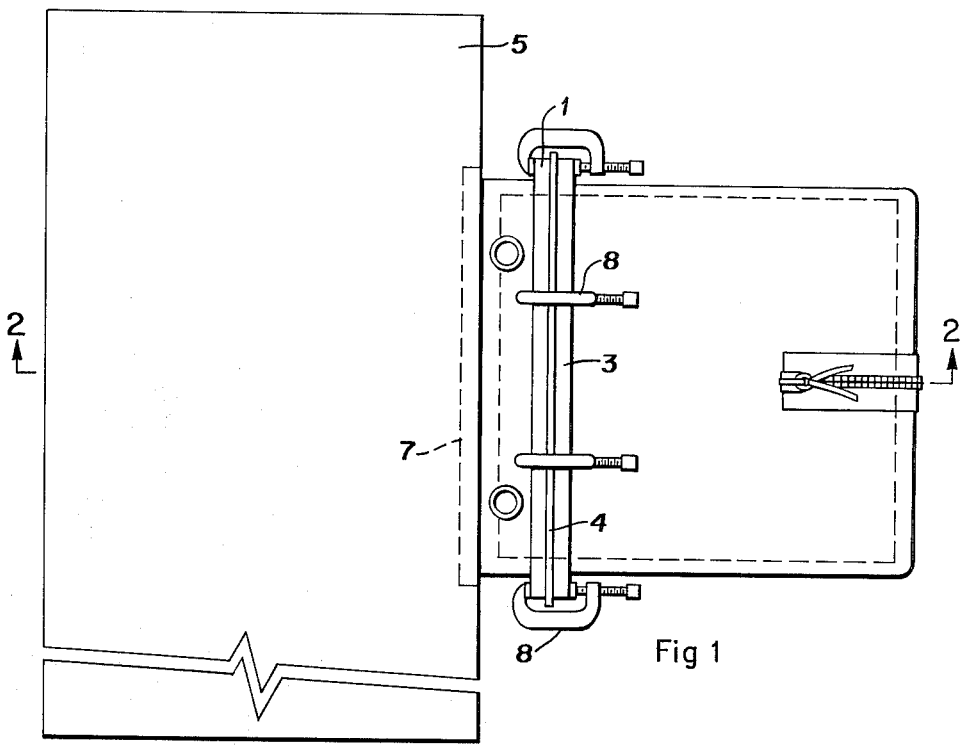
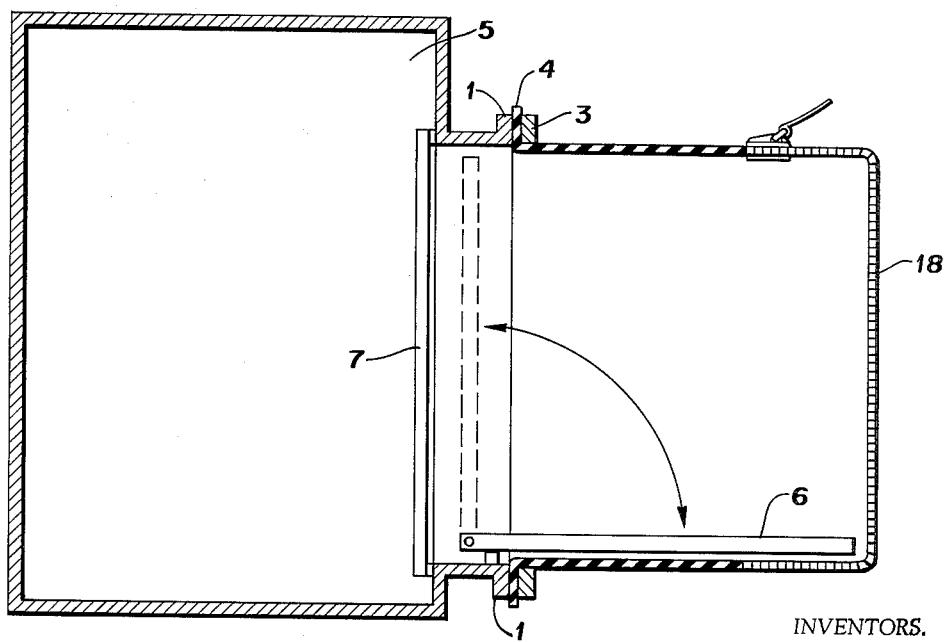
INVENTORS.
Robert N. Wagner
George K. Ford
BY
Roland C. Anderson
ATTORNEY.

July 12, 1966 R. N. WAGNER ETAL 3,260,381
APPARATUS AND METHOD FOR TRANSFERRING
OBJECTS INTO A CONDITIONED ATMOSPHERE
Filed April 29, 1964 2 Sheets-Sheet 2
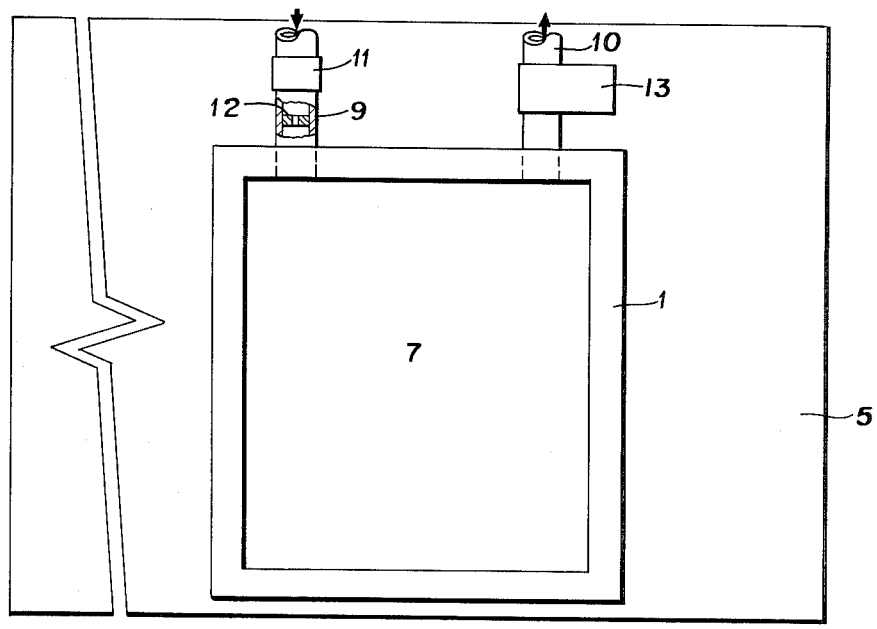
Fig 3
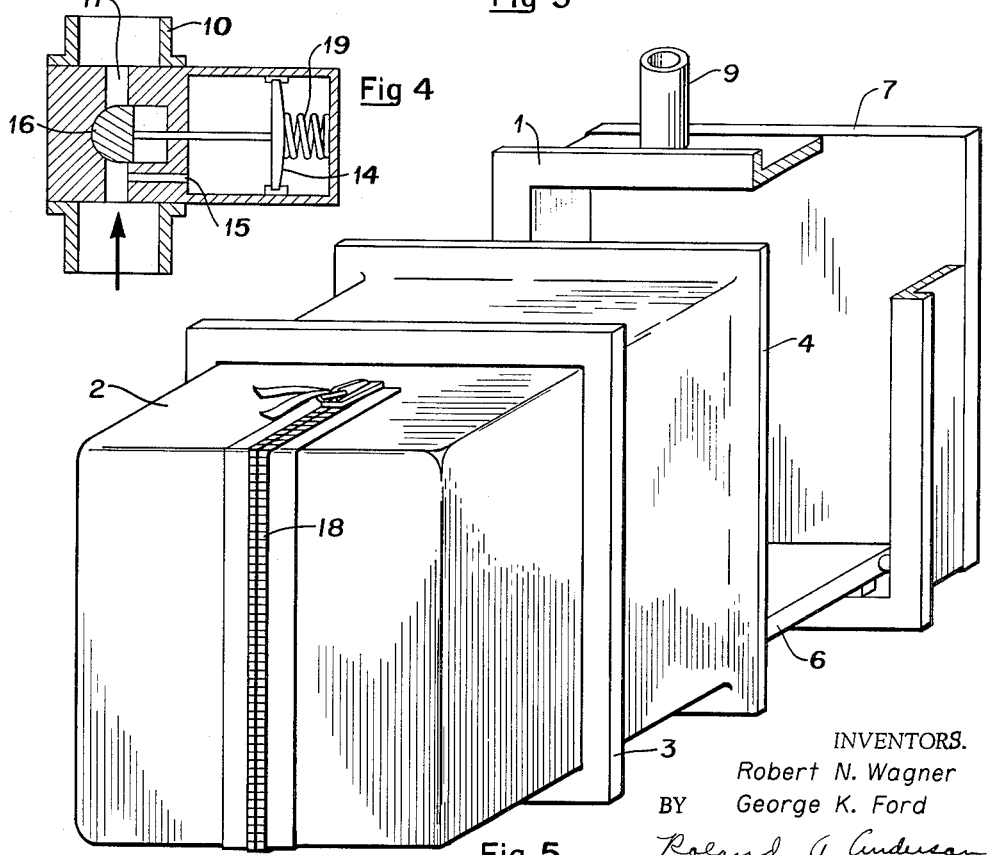
Fig 4
Fig 5
INVENTORS.
Robert N. Wagner
George K. Ford
BY
Roland A. Anderson
ATTORNEY.

United States Patent Office 3,260,381
Patented July 12, 1966

1

3,260,381
APPARATUS AND METHOD FOR TRANSFERRING OBJECTS INTO A CONDITIONED ATMOSPHERE
Robert N. Wagner and George K. Ford, both of Knoxville, Tenn., assignors to the United States of America as represented by the United States Atomic Energy Commission
Filed Apr. 29, 1964, Ser. No. 364,068
5 Claims. (Cl. 214—17)

This invention relates to atmosphere locks, and more particularly to a collapsible structure for providing an entrance into a work enclosure having a controlled atmosphere.

Work areas or compartments often require an atmosphere which will protect or preserve the qualities of equipment or materials while they are being worked on, or protect personnel while performing their duties. For instance, materials which may be affected by moisture may require an atmosphere of low humidity when work is being performed thereon, or materials that may be attacked by certain elements in the air may require an inert atmosphere while being machined, formed or assembled.

In the former case, it may be desirable to introduce personnel and/or materials into a conditioning chamber and then into the work area. In the latter case, it will be desirable to only introduce the material or equipment into the compartment through the chamber and carry out the operations thereon by remote control.

In the prior art, it has been the practice to introduce either the personnel or materials and/or equipment to the controlled atmosphere work area or enclosure through a rigid structure which defines a compartment or chamber. This structure includes two doors, one of which opens into the controlled atmosphere work area and the other opens to the outside. To condition the chamber, it is purged of atmospheric air for a period of 30 to 45 minutes, by introducing conditioned atmosphere into the chamber on one side and removing or venting the contents of the chamber on the other. For this purpose, ducts or pipes communicate with the chamber at either end thereof.

After the chamber is conditioned for a suitable time, the outside door is opened and personnel and/or materials or equipment are introduced into the chamber and the door is closed. Then after a further suitable period while the purging continues, the door from the chamber to the work area is opened and the personnel and equipment pass into the work area, closing the door after their entry.

The conventional "air locks" are large chambers built of some rigid material which will withstand the pressure that sometimes is utilized or the vacuum which alternatively may be utilized to cause the atmosphere within the chamber to be converted into an atmosphere identical with that within the controlled atmosphere work area. These conventional "air locks" have at least three major undesirable features: (1) they are expensive to fabricate, (2) they occupy space which could better be utilized for processing areas, and (3) they require a large volume of purge gas and/or a long purging time in converting the atmosphere into one compatible with the controlled atmosphere within the work area.

Applicants with a knowledge of these problems of the prior art have for an object of their invention the provision of a collapsible conditioning chamber for introducing personnel, work, materials or equipment into a work area having a conditioned atmosphere.

Applicants have as another object of their invention the provision of a collapsible bag of flexible material suitable for use as a conditioning chamber to contain a suitable transitional atmosphere for introducing objects or personnel into the conditioned atmosphere of a closed work area.

Applicants have as another object of their invention the provision of a collapsible chamber of flexible material with a leak-tight zipper for introducing objects into the chamber for transfer into a work area having a conditioned atmosphere.

Applicants have as a further object of their invention the provision of a system for purging a collapsible conditioning chamber in a portion of the time heretofore required for purging conditioning chambers of the prior art.

Applicants have as a still further object of their invention the provision of a collapsible and inflatable conditioning chamber that normally occupies only a small part of the space occupied by chambers of the prior art.

Applicants have as a still further object of their invention the provision of a conditioning chamber that requires a smaller volume of purging gas than those structures of the prior art.

Applicants have as a still further object of their invention the provision of a collapsible, inflatable chamber connected to a work area enclosure which may be distorted or deformed during the transfer of an object therefrom to the work area to facilitate easy movement of the object.

Other objects and advantages of our invention will appear from the following specification and accompanying drawings, and the novel features thereof will be particularly pointed out in the annexed claims.

In the drawings, FIG. 1 is a plan view of our improved collapsible chamber mounted on a work area enclosure. FIG. 2 is a sectional elevation of a work area enclosure with the collapsible bag thereon, taken along the line 2—2 of FIG. 1. FIG. 3 is a front elevation of the work enclosure with the purge supply and vent exhaust lines connected to the door frame. FIG. 4 is a sectional detail of a suitable venting valve shown in schematic. FIG. 5 is an exploded view of the enclosure frame, bag and clamping frame of our improved system.

Referring to drawings in detail, 5 designates an enclosure of steel, wood or other suitable material defining a work area enclosure for containing a suitable atmosphere in which machine tools, personnel and workpieces or materials may be housed. Formed in one wall of enclosure 5, as shown in FIG. 1, is a door 7 with suitable gaskets to provide a gas tight closure. It is preferably mounted to slide into or out of place, but may use any other suitable mounting. Projecting outwardly from the wall of enclosure 5 is a frame having a flange 1 for mounting a collapsible, inflatable bag 2 of neoprene or other suitable flexible material. The bag 2 has an included flange 4 whose inner face is adapted to abut up against and conform to the flange 1 of the mounting frame of enclosure 5. This flange 1 may be preformed and separately joined to the bag as shown in FIG. 5 or it may be an integral part of the sides of the bag and be formed by turning up and clamping in place, as shown in FIG. 2. Disposed about the bag 2 and engageable with outer face of flange 4 of bag 2 is a rigid frame 3 of metal or other suitable material. Adjustable clamps 8 of conventional type and of suitable form serve to engage flange 1 and frame 3 and urge them together, clamping the flange 4 of bag 2 between them in the manner of a sandwich to provide a gas-tight seal.

If desired, the bag 2 may extend to the floor which will provide a supporting surface for objects introduced into a work area, otherwise a folding platform 6, hingedly mounted on the enclosure 5 and movable into vertical or horizontal adjusted position may be disposed within bag 2. When needed, it may be lowered and locked in position by any suitable locking mechanism. When not in use, it may be folded to vertical position.

The purging gas, whether dry air, nitrogen or some other gas, is fed into the chamber to inflate the collapsible bag 2 through lead-in duct 9 and the purged gas, if any, in the bag is removed through the vent duct 10, as shown in FIG. 3. Both ducts may be joined to the frame along the top flange 1 of enclosure 5.

The supply and removal of gas is controllable either manually or automatically. Valve 11 is positioned in intake line 9 and may be a manual or a solenoid operated valve, as desired. Gas flows under a pressure of 3 inches of water through a limiting orifice 12 into bag 2. The vent line 10 may contain a manually operated valve or a solenoid operated valve 13 of conventional construction, if desired. A suitable solenoid valve is the Model 250, pneumatic actuator, made by Contromatic Corporation of Rockville, Connecticut. A suitable valve structure is shown in schematic in FIG. 4. This valve and its actuator contains a diaphragm 14, which is biased by compression spring 19, and gas is admitted into and through opening 15. When sufficient pressure is applied to overcome the force of spring 19, semi-spherical valve element 16 is unseated in the orifice 17, permitting gas to be periodically vented through the orifice 17 and line 10. However, orifice 12 is always smaller than orifice 17 so there is a limited amount of gas that can be vented through line 10. This provides a pulsating flow of gas through the chamber and permits satisfactory purging in about two minutes. This results in a considerable savings in time for personnel who might otherwise be waiting for the chamber to be properly purged before attempting to move objects into the work area.

The back face of the bag 2, as shown in FIGS. 3 and 4, is provided with an appropriate leak-tight zipper 18 (one suitable type of zipper is Model 8 DBM, Self-Sealing Slide Fastener, manufactured in the United States by Talon, Inc. of Meadsville, Pennsylvania, under patent agreement with New Zipper Company, Ltd., Slough Banks, England), of plastic, rubber or other suitable material, which is joined to the bag by gluing, cementing or vulcanizing. Objects to be introduced into the work area enclosure are placed in the bag and the zipper closed. Then the atmosphere of the bag is purged and the bag is inflated before the door 7 to the enclosure 5 is opened and the object moved into the work enclosure.

In its operation the conditioning chamber is sealably secured about the closed door to a controlled atmosphere hood, the bag defining the chamber is unzipped and an object placed within the bag. The bag is next zipped closed and then completely exhausted thereby collapsing the bag and significantly reducing the volume of contaminated atmosphere, and then back-filled through line 9 with an atmosphere identical with the one within the controlled atmosphere hood. Purging and evacuation takes place intermittently through vent line 10 to remove essentially all undesired gases within the bag.

If it is desired to return or remove an object, such as an individual material or equipment, from the work enclosure to the outside or external atmosphere, the operation is similar to that outlined above. However, the bag defining the chamber must first have its atmosphere conditioned as outlined, and then the communicating door between the work enclosure and the bag is opened and the object transferred to the bag. When the door is again closed, the bag may be deflated by valving off or removing the source of conditioning gas while still venting the interior of the bag. When the bag is collapsed, the zipper may be opened and the object removed.

The advantages of the present development include (1) the collapsible chamber, which when not in use, hangs limply from the side of the hood and does not occupy appreciable work area, (2) this bag is relatively inexpensive to fabricate since most any material which is flexible, such as gum rubber, neoprene, nylon and many others may be utilized as construction materials for fabricating the bag, and (3) the purging time for intermittently back filling and evacuating while the bag is inflated is considerably less than the time required for intermittently back filling and evacuating a comparable size rigid chamber. The collapsible nature of the bag effects this latter advantage by reducing the amount of "back filling" atmosphere which is utilized to create an atmosphere within the lock identical to the atmosphere within the hood. This is occasioned by the elimination of purging, the usual means for changing the atmosphere of a rigid lock.

One preferred type of lock, as shown in FIG. 1, utilizes approximately 20 to 25 c.f.m. of nitrogen per opening operation as compared to about 300 to 350 c.f.m. employed for creating the desired atmosphere in a comparable size (volume) metal "air lock." The time required to complete an opening operation utilizing the subject development is approximately three minutes. This is to be compared with the average of thirty to forty minutes required to complete an opening operation with the prior metal "rigid air locks" of comparable volume.

Having thus described our invention, we claim:

1. A method of transferring objects from a normal atmosphere to a conditioned atmosphere comprising the steps of sealably securing a collapsible bag about the closed door of a compartment containing conditioned atmosphere, introducing an object into the collapsible bag, filling the bag with conditioned atmosphere and collapsing it to remove gases trapped therein, and then opening the door to insert the object into the compartment having conditioned air.

2. A structure for introducing an object into the controlled atmosphere of a work area comprising an enclosure defining a work area having a conditioned atmosphere, a door for sealing off the work area, a collapsible bag secured to the enclosure and enclosing the door, a sealable opening in the bag for passage of an object, and means for supplying conditioned air to the bag while venting the contents to the atmosphere.

3. An arrangement for introducing objects into a work area having a conditioned atmosphere comprising an enclosure defining a work area, a door in the enclosure for maintaining a conditioned atmosphere, a collapsible bag defining a chamber and having its open end joined to the enclosure and enclosing the door, a leak-tight entrance formed in the wall of the bag for introducing an object into the chamber, and means for inflating and purging the bag to condition the atmosphere therein for transfer of the object through the door into the enclosure.

4. A method of transferring an object from the atmosphere into an enclosure having a conditioned atmosphere comprising the steps of introducing the object into a collapsible bag sealably joined at a closed entrance to an enclosure having a conditioned atmosphere, closing the bag and introducing, for a predetermined period of time, a conditioning gas therein while venting the bag to the atmosphere to purge it, then opening the entrance and transferring the object from the chamber into the enclosure.

5. A method of transferring an object from the atmosphere into an enclosure having a conditioned atmosphere comprising the steps of introducing the object into a collapsible bag sealably joined at a closed entrance to an enclosure having a conditioned atmosphere, closing the bag and introducing, for a predetermined period of time, a conditioning gas therein while intermittently venting the bag to the exterior to purge it and condition the atmosphere therein, then opening the entrance and transferring the object from the chamber into the enclosure.

References Cited by the Examiner

UNITED STATES PATENTS 2,845,191 7/1958 McDermott _____ 214—17
2,869,749 1/1959 Arne et al. _____ 220—20.5 X GERALD M. FORLENZA, *Primary Examiner.*

R. SHERIDAN, *Assistant Examiner.*